Nov. 4, 1969  V. M. PHILLIPS  3,476,280
LIFTABLE COVERS FOR AUTOMOBILE BODY COMPARTMENTS
Filed Dec. 4, 1967  2 Sheets-Sheet 1
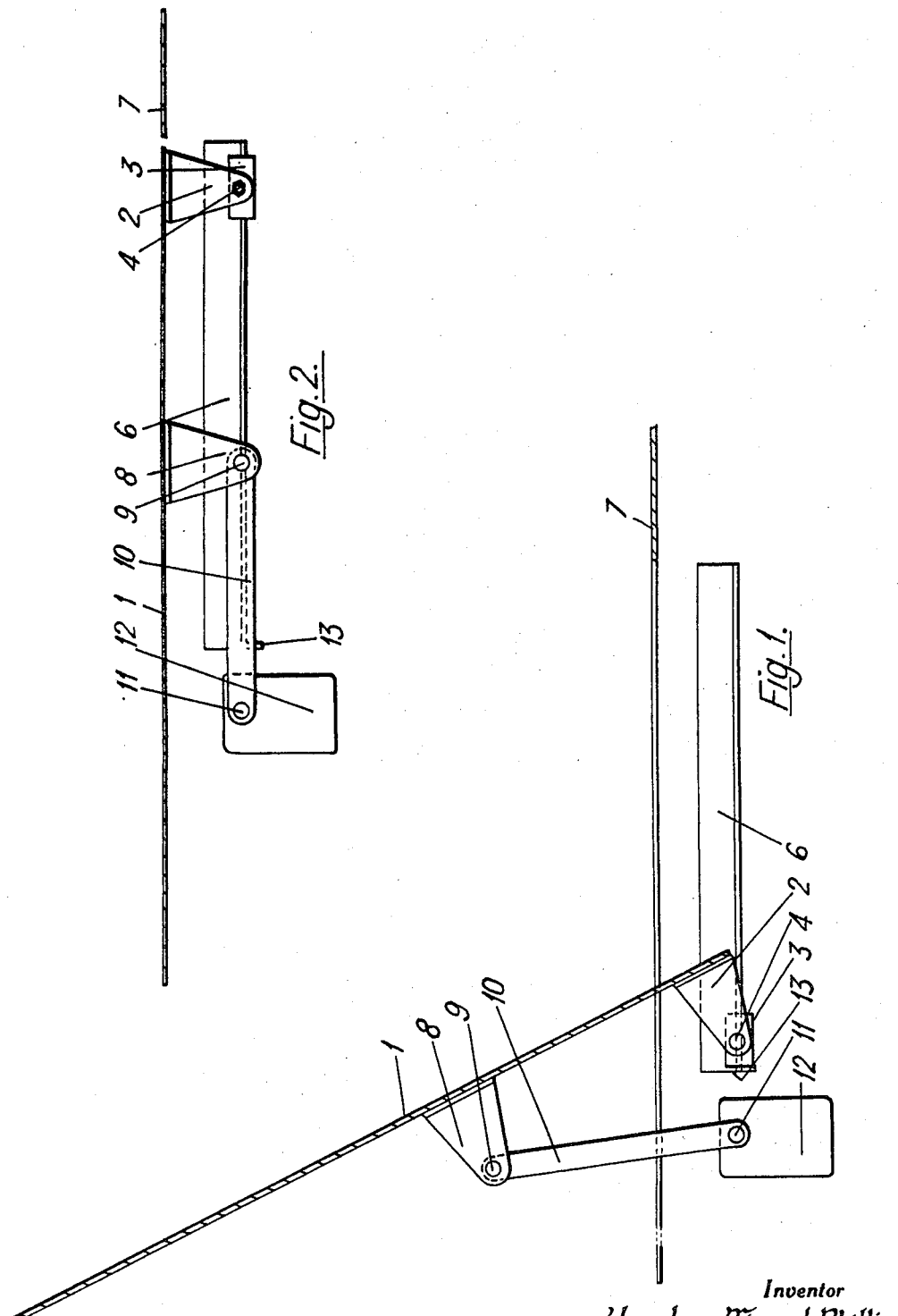
Inventor
Vaughan Mansel Phillips
BY
David A. Greenlee
Attorney Nov. 4, 1969 V. M. PHILLIPS 3,476,280
LIFTABLE COVERS FOR AUTOMOBILE BODY COMPARTMENTS
Filed Dec. 4, 1967 2 Sheets-Sheet 2

Inventor
Vaughan Mansel Phillips
BY
David A. Greenlee
Attorney

Patented Nov. 4, 1969

3,476,280
LIFTABLE COVERS FOR AUTOMOBILE BODY
COMPARTMENTS
Vaughan Mansel Phillips, Luton, England, assignor to General Motors Corporation, Detroit, Mich., a corporation of Delaware
Filed Dec. 4, 1967, Ser. No. 687,644
Claims priority, application Great Britain, Dec. 15, 1966, 56,191/66
Int. Cl. B65d 43/24
U.S. Cl. 217—60                              2 Claims

ABSTRACT OF THE DISCLOSURE

A liftable cover for the engine or trunk compartment of an automobile body, in which the front or rear edge of the cover is pivotally connected to nylon blocks slidable on tracks fixed to the bodywork, and hold-open stays are pivotally connected between the bodywork and the cover in such a way that, upon lifting the edge of the cover remote from the nylon blocks, the blocks move along the tracks towards the mounting of the stays on the bodywork until they engage stops fixed to the tracks in which position the hold-open stays are located over-centre with regard to their pivotal mountings on the bodywork so that the cover is held in an open position.

---

The invention is concerned with providing a liftable cover which is cheap and simple in construction and is suitable for the engine or trunk compartment of an automobile. The invention is particularly applicable to small motor cars which have relatively light covers for the engine and trunk compartments and which do not, therefore, require counterbalance springs.

According to the invention there is provided an automobile body having a liftable cover for a body compartment, comprising a cover hinge member secured in the region of one end of the cover, a guide track secured to the automobile body, a slider which is pivoted to the hinge member and which engages the guide track and is movable relative thereto, and a hold-open stay which is pivotally connected between the cover and the automobile body, whereby upon upward opening movement of an end of the cover remote from the hinge member, the slider is moved relative to the guide track towards the hold-open stay mounting on the automobile body.

The scope of the invention is defined by the appended claims; how the invention can be performed is described with reference to the accompanying drawings, showing a liftable cover for a front engine compartment of an automobile body, in which:

FIGURE 1 is a side view of the cover in an open position;

FIGURE 2 is a side view of the cover in a closed position;

Figure 4:
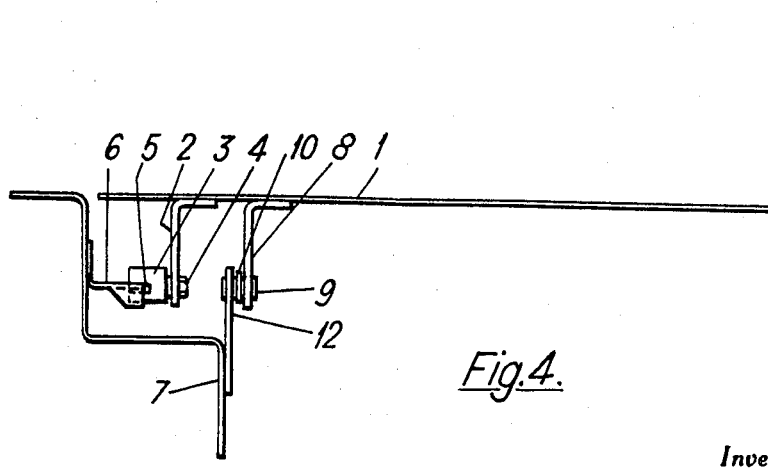
FIGURE 4 is a front end view of the cover in the closed position.

Referring to the drawings, the hood or bonnet cover for the engine compartment consists of a flat plate 1 of light construction the rear end of which has secured at each side a downward hinge bracket 2 pivoted to a nylon block 3 on a pivot 4, the block 3 having a slot 5 (FIGURE 4) therein by means of which it is slidable along a slide bar or track 6 fixed to the bodywork 7 of the automobile.

The slide bars 6 are directed in a fore-and-aft direction in relation to the vehicle and afford guide tracks for the sliders 3. The cover has, spaced some distance from the hinge brackets 2, a downwardly-projecting bracket 8 on each side. To each of these brackets 8 is pivoted, on pivot 9, one end of a hold-open stay in the form of a straight link 10, the bottom end of which is pivoted, on pivot 11, to a bracket 12 fixed to the bodywork 7 and situated a short distance forward of the front end of the neighbouring slide bar 6. At the forward end of each slide bar there is a stop 13 to prevent the further forward movement of the nylon block.

Figure 3:
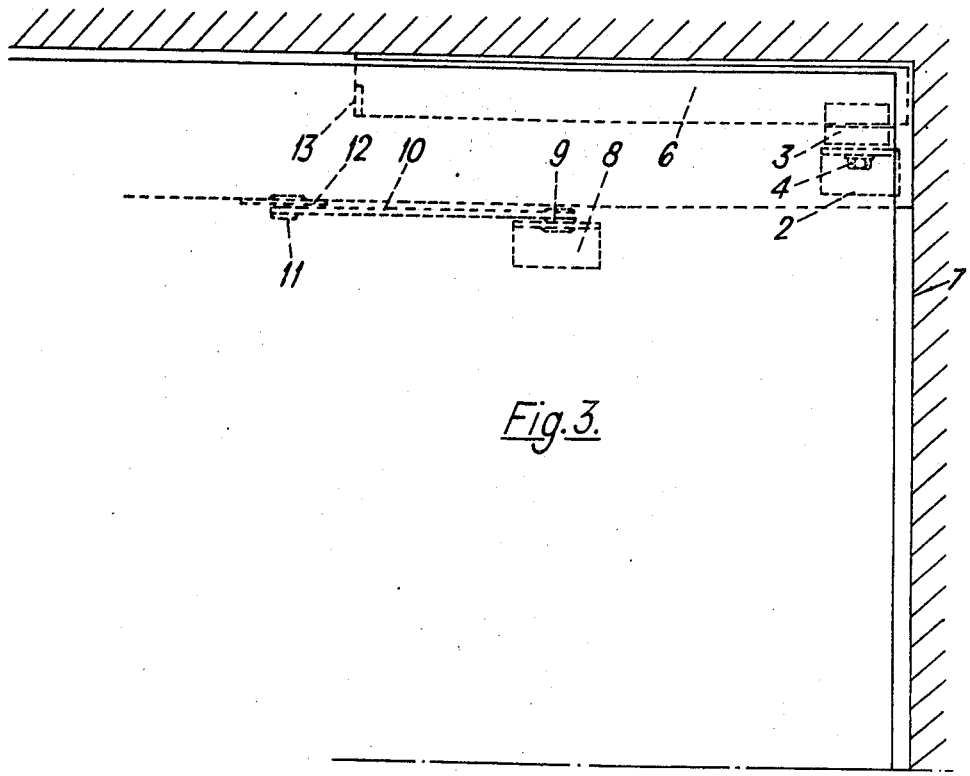
FIGURE 3 is a plan view of the cover in the closed position.

When the hood is in the closed position (FIGURES 2 to 4) the nylon blocks 3 are located at the rear of the slide bars 6, and the hold-open links 10 are rearwardly directed and in an approximately horizontal position. In opening the hood cover, the front end of the cover is lifted, which causes the upward swinging of the hold-open stays 10 on their pivots 11, and at the same time this movement of the stays draws the nylon blocks 3 forward on the slide bars 6, so that the hinge members, which include the blocks 3, move forwards. The position of the stops 13 on the slide bars 6 is such that the forward movement of the hinge members is halted when the hold-open stays 10 have swung upwards through a sufficient angle to carry them just beyond a perpendicular passing through the pivots 11 of the stays 10 to the fixed bodywork 7. In this position the hold-open stays 10 have described slightly more than a right angle and have, so to speak, passed "over-centre" in relation to the pivot of the stays 10 to the fixed bodywork.

In this condition the weight of the raised hood cover tends to swing the hold-open stays 10 further forwards and downwards about their pivots 11, but due to the spaced-apart pivots 11, 4 of the sold-open stays 10 and of the hood cover respectively, the cover cannot in fact fall and is held open by the stays 10 until it is pulled downwards so as to start the hinge members sliding in a rearward direction along the slide bars 6, whereupon the hold-open stays 10 pivot rearwardly to their original horizontal position, in which the cover is fully closed.

If desired, rollers can be substituted for the slidable nylon blocks.

I claim:

1. In a vehicle body having an open multi-sided compartment therein bounded by a first end, a second end across the opening from the first end, and sides interconnecting the ends, the combination comprising, a plate of the general shape of the opening movable between a closed position wherein the plate covers the opening with a first end of the plate located adjacent the first end of the compartment, a second end of the plate located adjacent the second end of the compartment and sides of the plate located adjacent respective sides of the compartment, and an open position wherein the first end of the plate is located adjacent the second end of the compartment and the second end of the plate is located above the opening of the compartment at the second end thereof, longitudinal guide means mounted in the compartment and located between the ends thereof for guiding the path of movement of the first end of the plate between the ends of the compartment, slide means for the guide means pivotally mounted to the plate adjacent the first end thereof slidably engaging the guide means for reciprocal movement therealong to guide the path of movement of the first end of the plate, and link means having one end thereof pivotally mounted to the plate intermediate the ends thereof and the other end thereof pivotally mounted to the compartment adjacent the second end thereof to guide the path of movement of the second end of the plate, the pivot of the slide means to the plate being located adjacent to and being to one side of a vertical line through the link means pivot to the compartment, the link means pivot to the plate being on the opposite side of the vertical line enabling the weight of the plate to hold the plate in the open position until the plate is moved to the closed position.

2. In a vehicle body having an open multi-sided compartment therein bounded by a first end, a second end directly across the opening from the first end, and sides interconnecting the ends, the combination comprising a plate of the general shape of the opening and movable between a closed position where the plate covers the opening with a first end of the plate located adjacent the first end of the compartment, a second end of the plate located adjacent the second end of the compartment and sides of the plate located adjacent respective sides of the compartment, and an open position wherein the first end of the plate is located adjacent the second end of the compartment and the second end of the plate is located above the opening of the compartment at the second end thereof, a pair of longitudinal guide tracks located in spaced generally parallel relationship and mounted adjacent respective sides of the compartment between the ends of the compartment for guiding the path of movement of the first end of the plate between the ends of the compartment, a pair of slides, each respective to a guide track and pivotally mounted to a respective side of the plate, each slide slidably engaging a respective guide track for reciprocal movement therealong to guide the path of movement of the first end of the plate, a pair of links, each link respective to a guide track, each link being pivotally mounted adjacent one end of the link to the plate intermediate the ends thereof and adjacent a respective side thereof and being pivotally mounted adjacent the other end of the link to the compartment adjacent the second end thereof and adjacent a respective side thereof to guide the path of movement of the second end of the plate, the pivots of the slides to the plate being located adjacent to and being to one side of a vertical plane through the pivots of the links to the compartment, the pivots of the links to the plate being on the opposite side of the vertical plane enabling the weight of the plate to hold the plate in the open position until the plate is moved to the closed position and stop means limiting movement of the slides along the guide tracks in the open position of the plate.

References Cited

UNITED STATES PATENTS 2,006,603   7/1935   Nordmark et al.
2,338,477   1/1944   Wolters et al.

RAPHAEL H. SCHWARTZ, Primary Examiner